Patented Oct. 26, 1943

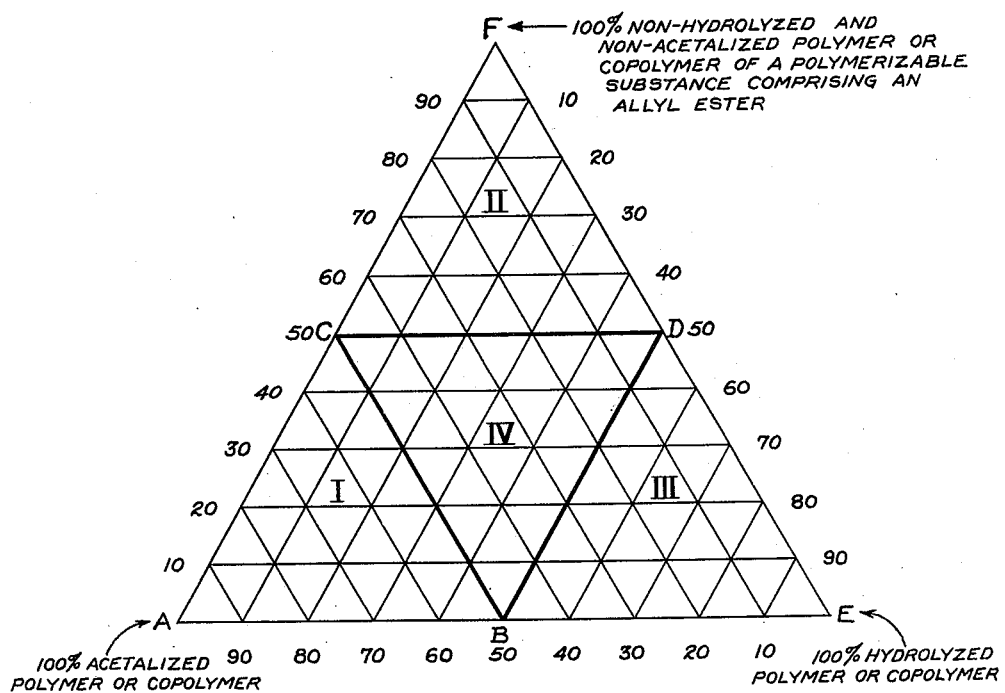

2,332,900

UNITED STATES PATENT OFFICE 2,332,900

SYNTHETIC COMPOSITION COMPRISING HYDROLYZED, ACETALIZED, AND/OR KETALIZED POLYMERS OF ALLYL ESTERS

Gaetano F. D'Alelio, Pittsfield, Mass., assignor to General Electric Company, a corporation of New York Application July 23, 1940, Serial No. 346,961

4 Claims. (Cl. 260—66)

This invention relates to the production of new materials having valuable and characteristic properties that make them especially suitable for use in industry, for example in molding, laminating, coating and adhesive applications, and for other purposes. The invention is concerned more particularly with the production of compositions of matter comprising an acetalized, a ketalized or an acetalized and ketalized product of polymerization of a polymerizable mass comprising at least one ester selected from the class consisting of allyl esters and their homologues. Such esters may be described more specifically as esters containing the grouping $$CH_2=\overset{R'}{\underset{\underset{R}{|}}{C}}-\overset{R}{\underset{|}{C}}-$$

where R is a member of the class consisting of hydrogen and hydrocarbon radicals (e. g., alkyl, aryl, aralkyl, alkaryl, hydrocarbocyclic, etc.) and R' is a member of the class which is the same as R and in addition a halogen atom. For purpose of brevity in describing the invention the term "allyl ester" is used generally hereafter to designate both the parent allyl ester and the homologues thereof.

The scope of the present invention also includes compositions comprising the product of reaction of a substance comprising a

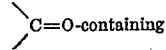-containing organic compound selected from the class consisting of aldehydes, ketones and mixtures of aldehydes and ketones with a substance comprising a hydrolyzed copolymer of a plurality of copolymerizable materials, at least one of which is an allyl ester. In the production of the latter compositions the other organic compound (or compounds) that is copolymerized with the allyl ester prior to hydrolysis and acetalization, ketalization or acetalization and ketalization preferably is a compound selected from the class consisting of ketones, ethers and nitriles each having at least one

grouping and unsaturated alkyl resins obtained by esterifying a polyhydric alcohol with an alpha, beta polycarboxylic acid containing aliphatic unsaturation between the alpha and beta carbon atoms.

It has been suggested heretofore that synthetic compositions may be prepared by partially hydrolyzing (saponifying) a mixed polymerization product of two different vinyl esters (or a vinyl ester and an ester of acrylic acid, each of said esters having a single

grouping and no other polymerizable grouping, and reacting the partially hydrolyzed product with an aldehyde or a ketone to introduce acetal or ketal groups into the product. In such acetalized or ketalized products the reaction takes place between the aldehyde or ketone and the vinyl alcohol part of the copolymer, which alcohol results from hydrolysis of the vinyl ester portion of the copolymer reactant.

Taking vinyl chloride and vinyl acetate as illustrative of the compounds previously suggested as suitable for forming a copolymer that subsequently might be acetalized or ketalized, the following structural formulas illustrate the steps in the production of the acetal derivative:

*Copolymer reactant before hydrolysis*

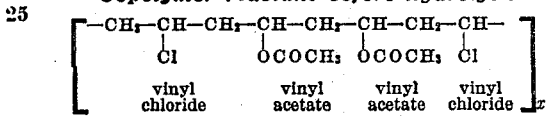

*After hydrolysis*

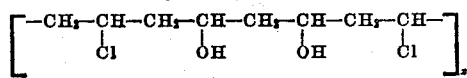

*After formalization*

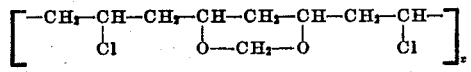

It will be noted that in this acetalization reaction a six-membered ring is formed. Such a ring is produced regardless of the acetalizing or ketalizing agent employed.

I have discovered that synthetic compositions which are different form, and in many respects superior to, organic artificial masses heretofore known can be prepared by acetalizing, ketalizing or acetalizing and ketalizing a partially or completely hydrolyzed product of partial or complete polymerization of a polymerizable mass comprising an allyl ester (e. g., diallyl oxalate, allyl acrylate, diallyl maleate, etc.); or by acetalyzing, ketalizing or acetalizing and ketalizing a partially or completely hydrolyzed product of partial or complete copolymerization of a plurality of copolymerizable materials including at least one allyl ester. The following structural formulas illustrate the formation of these new synthetic compositions, more particularly the production of an acetalized, specifically formalized, derivative of a polymer of allyl oxalate as I postulate the reactions involved:

*Polymeric body before hydrolysis*

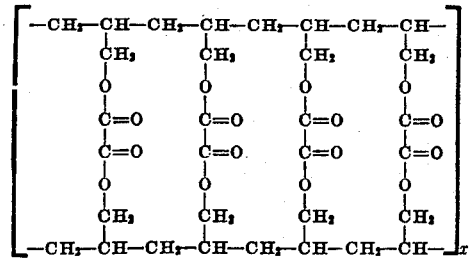

*After hydrolysis*

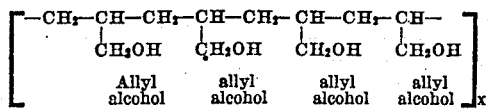

*After formalization*

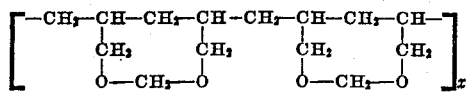

It will be noted that the above formalized hydrolysis product of polymeric allyl oxalate contains an eight-membered ring. The differences between an acetalized, ketalized or acetalized and ketalized product of hydrolysis of a polymeric vinyl ester (or a copolymer of a vinyl ester and another polymerizable organic compound) and an acetalized, ketalized or acetalized and ketalized product of hydrolysis of a polymeric allyl ester (or a copolymer of an allyl ester and another compound copolymerizable therewith) at once are apparent from a comparison of the above formula for the formalized product of hydrolysis of polymerized allyl oxalate with the formula for the formalized hydrolysis product of copolymerized vinyl chloride and vinyl acetate, which latter contains a six-membered ring.

When an allyl ester having one

grouping and at least one other polymerizable grouping is polymerized, cross-linkage occurs. It was quite surprising and unexpected to find that such cross-linked polymers could be acetalized, ketalized or acetalized and ketalized particularly in view of the fact that these materials are infusible and substantially insoluble in all the ordinary solvents. I have also found that such reaction products of a hydrolyzed, polymerized allyl ester with an aldehyde, a ketone or a mixture of an aldehyde and a ketone, as well as acetalized, ketalized or acetalized and ketalized cross-linked copolymers produced from a polymerizable mass comprising an allyl ester and another organic compound (or compounds) copolymerizable with the allyl ester, are sufficiently thermoplastic that, unlike the starting polymeric body, they can be molded under heat and pressure to a desired shape.

In carrying my invention into effect I hydrolyze a product of polymerization of a polymerizable mass comprising an allyl ester, or comprising an allyl ester and one or more other organic compounds copolymerizable therewith, for example organic compounds containing a single

grouping or containing at least one

grouping and one or more other polymerizable groups, e. g., one or more additional

groupings. I then cause the hydrolyzed polymeric body to react with a

organic compound selected from the class consisting of aldehydes, ketones and mixtures of aldehydes and ketones until at least some of the hydroxyl groups of the hydrolyzed polymer have been replaced by the corresponding acetal, ketal or acetal and ketal groups. For example, I may hydrolyze the polymeric substance to at least 10 per cent, more particularly from 25 to 100 per cent, of that theoretically possible and then acetalize, ketalize or acetalize and ketalize the hydrolyzed polymer until at least 10 per cent of the hydroxyl groups of the hydrolyzed polymer have been replaced by acetal, ketal or acetal and ketal groups. In some cases, for instance where the resistance of the product to water is of secondary consideration, the hydrolyzed polymer may have only a minor proportion (that is, less than 50 per cent) of its hydroxyl groups replaced by acetal, ketal or acetal and ketal groups. For most applications, however, it is usually desirable that at least 50 per cent, say 60 to 100 per cent, of the hydroxyl groups of the hydrolyzed polymer be replaced by acetal, ketal or acetal and ketal groups. Particularly valuable products are obtained when the polymeric body is hydrolyzed to from 60 to 100 per cent of that theoretically possible and the hydrolyzed polymer is acetalized, ketalized or acetalized and ketalized until from 75 to 100 per cent of the hydroxyl groups of the hydrolyzed polymer have been replaced by the corresponding acetal, ketal or acetal and ketal groups.

In order that those skilled in the art better may understand how to practice this invention, the following more detailed description is given:

*Preparation of polymeric body*

In effecting polymerization of a polymerizable mass comprising as an essential component an allyl ester or an allyl ester and at least one other organic compound copolymerizable therewith, the mass is polymerized in the presence or absence of a polymerization catalyst, e. g., benzoyl peroxide in a concentration within the range of 0.1 to 2.0 per cent by weight of the whole, and at normal or at elevated temperatures, e. g., at from room temperature (20° to 30° C.) to 130° C. Ordinarily I use temperatures within the range of 60° to 120° C. in causing the mass to polymerize. Additional examples of polymerization catalysts that may be used are given in various copending applications of mine, for instance in copending application Serial No. 336,981, filed May 24, 1940, and assigned to the same assignee as the present invention.

Various allyl esters of organic and inorganic acids may be used in preparing my polymeric reactant. For example, I may use allyl esters of carboxylic acids, more particularly monocarboxylic acids and polycarboxylic acids. However, with allyl esters of saturated monocarboxylic acids, e. g., allyl acetate, the rate of polymerization is so slow and the molecular weight of the polymer so low that the resulting acetalized, ketalized or acetalized and ketalized products have limited utility in the plastics and coating arts as compared with allyl esters of unsaturated monocarboxylic acids. Allyl phosphates and allyl esters of other inorganic oxy-acids also may be used. In carrying the present invention into effect I prefer to use allyl esters of unsaturated monocarboxylic acids and allyl esters of saturated and unsaturated polycarboxylic acids, since such esters polymerize more rapidly and yield high molecular weight polymeric bodies.

In certain cases, instead of polymerizing a single allyl ester having at least one

grouping, I may copolymerize a plurality of different allyl esters. Also, I may copolymerize a single or a plurality of allyl esters with at least one other organic compound copolymerizable with the allyl ester (or esters) to form a copolymer reactant of improved utility in the production of an acetalized, ketalized or acetalized and ketalized copolymer of particular properties. Examples of such modifying bodies which may be used in preparing a copolymer reactant are maleate and fumarate esters of monohydric alcohols; acrylaldehydes; unsaturated ethers having a single

grouping and no other polymerizable grouping, examples of which are given in my copending application Serial No. 343,228, filed June 29, 1940; unsaturated ethers having one

grouping and at least one other polymerizable grouping, examples of which are given in my copending application Serial No. 336,981, filed May 24, 1940; unsaturated ketones having at least one

grouping, examples of which are given in my copending application Serial No. 339,303, filed June 7, 1940; modified or unmodified unsaturated alkyd resins produced by esterifying a polyhydric alcohol with an alpha, beta polycarboxylic acid containing aliphatic unsaturation between the alpha and beta carbon atoms, examples of which are given in my copending application Serial No. 343,227, filed June 29, 1940; and unsaturated organic nitriles having at least one

grouping, examples of which are given in my copending application Serial No. 344,743, filed July 10, 1940. All of the above-identified copending applications are assigned to the same assignee as the present invention.

Illustrative examples of allyl esters, in addition to those previously mentioned, that may be employed in preparing the starting polymeric reactant are the allyl (including the homologous allyl) esters of saturated and unsaturated, aliphatic and aromatic, monobasic and polybasic acids. More specific examples are the allyl and homologous allyl esters of carboxylic acids, for instance: chloroacetic, bromopropionic, alkacrylic (e. g., methacrylic, ethacrylic, propacrylic, etc.), crotonic, malonic, succinic, glutaric, adipic, pimelic, suberic, azelaic, sebacic, benzoic, toluic, phenyl actic, phthalic, terephthalic, benzoyl phthalic, cinnamic, tricarballylic, tartaric, citric, lactic, etc., including the alpha unsaturated alpha beta polycarboxylic acids, e. g., maleic, monohalomaleic, fumaric, monohalofumaric, citraconic, mesaconic, acetylene dicarboxylic, aconitic, itaconic, etc.

The polymeric reactant may be partially or completely hydrolyzed and thereafter acetalized, ketalized or acetalized and ketalized; or, the partial or complete acetalization, ketalization or acetalization and ketalization of the polymer may be caused to take place simultaneously with the partial or complete hydrolysis of the polymer.

When the polymeric body is hydrolyzed separately from the reaction with the

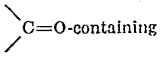

compound, this may be done, for example, by heating the polymer with a liquid medium comprising water and a suitable catalyst, examples of which are strong alkalies (e. g., sodium and potassium hydroxides, tetra-alkyl ammonium hydroxides, etc.) and acidic bodies (e. g., mineral acids such as hydrochloric, sulfuric, etc., and acidic salts such as aluminum chloride, zinc chloride, etc.) until the desired degree of hydrolysis has been effected. I prefer to use an acid catalyst. The hydrolyzed product, with or without first being purified (or partially reesterified if the hydrolysis has been carried farther than desired), then is acetalized, ketalized or acetalized and ketalized by causing it to react under acid conditions with a substance comprising an aldehyde, a ketone, a mixture of different aldehydes, a mixture of different ketones, or a mixture of one or more aldehydes and one or more ketones. The reaction with the

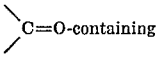

compound is continued until the desired percentage of hydroxyl groups in the hydrolyzed polymer have been replaced by acetal, ketal or acetal and ketal groups. The solid reaction product then is isolated from the reaction mass, washed and dried.

Preferably I conduct the acetalization, ketalization or acetalization and ketalization reaction, under acid conditions, simultaneously with the hydrolysis of the polymeric substance. This may be done, for example, by treating the polymer with a liquid medium comprising water, an acidic catalyst (examples of which were given in the preceding paragraph) and an organic compound containing or engendering an active carbonyl

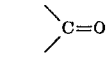

grouping, e. g., aldehydes, ketones, etc. Preferably the reaction is carried out in the presence of a substance comprising a liquid medium adapted to cause a molecular dispersion of the reaction product, e. g., in acetic acid, propionic acid, liquid (or liquefiable) monohydric alcohols, e. g., ethyl alcohol, butyl alcohol, amyl alcohol, etc., mixtures of liquid alcohols, acids and esters, etc. To shorten the time required for treating the polymeric substance, it is desirable to maintain the reactants at an elevated temperature, say 60° to 100° C. or above, the exact temperature depending more or less upon the boiling point of the mixture. Ordinarily the reaction is carried out under reflux at or approaching the boiling point of the reaction mass. At the end of the reaction period the solid reaction product (acetalized, ketalized or acetalized and ketalized polymerization product) is isolated from the liquid reaction mass containing the same.

After the conjoint hydrolysis and reaction with the $$\diagdown C=O\text{-containing}\diagup$$

compound has been carried to the desired stage as determined by analysis or by previous experience, the reaction mass usually is mixed with water to which may be added, if desired, a neutralizing agent (e. g., ammonia, sodium and potassium hydroxides and carbonate, etc.) for the acidic bodies. This causes coagulation of the treated polymer (or copolymer), which thereafter is washed until free from water-soluble materials and then dried. The resulting products may be shaped by the application of heat, pressure or heat and pressure.

As agents for treating the polymeric body I may use any aldehyde or ketone or any compound engendering an aldehyde or a ketone during the acetalization reaction. Examples of such compounds are formaldehyde, paraformaldehyde, paraldehyde, trioxymethylene, acetaldehyde, propionaldehyde, butyraldehyde, acrolein, methacrolein, crotonaldehyde, benzaldehyde, cinnamic aldehyde, anisaldehyde, p-methoxy phenyl acetaldehyde, furfural, acetone, chloroacetone, methyl vinyl ketone, divinyl ketone, methyl ethyl ketone, acetophenone, benzophenone, quinone, tetrahydroquinone, benzil, benzoyl acetone, acetyl dibenzoyl methane, benzal acetophenone, mesityl oxide, shogaol, cyclohexanone, vanillin, zingerone, alpha - oxytetrahydronaphthalene, paenol, etc.

The properties, for example hardness, of the final product are considerably influenced by the particular $$\diagdown C=O\text{-containing}\diagup$$

compound used. Thus, for the same polymer and the same degree of hydrolysis and acetalization, formaldehyde will yield a harder acetalized polymer than propionaldehyde. On the other hand, acrolein and furfural yield more solvent-resistant polymers than formaldehyde. Mixtures of different aldehydes or of different ketones may be used in certain cases to impart particular properties to the final product. In such modifications, the mixed $$\diagdown C=O\text{-containing}\diagup$$

compounds may be caused to react together upon the hydrolyzed polymerization product, the hydrolysis being carried out first and reaction with the $$\diagdown C=O\text{-containing}\diagup$$

compound afterwards, or hydrolysis and condensation with the mixed $$\diagdown C=O\text{-containing}\diagup$$

compounds may be carried out simultaneously. Or, the hydrolyzed polymer may be reacted first with one $$\diagdown C=O\text{-containing}\diagup$$

compound and then with another. Or, simultaneous hydrolysis and partial reaction with one $$\diagdown C=O\text{-containing}\diagup$$

compound may be caused to take place, followed by more complete acetalization, ketalization or acetalization and ketalization with a different $$\diagdown C=O\text{-containing}\diagup$$

compound.

By varying the time and temperature of reaction and the concentration of the catalytic agent and the $$\diagdown C=O\text{-containing}\diagup$$

compound, it is possible to vary the extent of hydrolysis and reaction of the polymer with the $$\diagdown C=O\text{-containing}\diagup$$

compound. If the hydrolysis is carried out in the absence of a $$\diagdown C=O\text{-containing}\diagup$$

compound, the extent of hydrolysis also may be controlled by carrying hydrolysis farther than is ultimately desired and then re-esterifying the excess hydroxyl groups. In re-esterifying, a different acid than that produced in the hydrolysis may be used thereby further to alter the properties of the final product.

The concentration of the polymerization catalyst and the temperature of polymerization used in the production of the starting polymeric reactant also influence the properties of the final product. High catalyst concentration and (or) high polymerization temperatures yield polymerizated products of lower molecular weight than result from lower amounts of catalyst and (or) lower polymerization temperatures. These differences are reflected in the properties of the final products.

The properties of the final product also may be varied by varying the extent of hydrolysis, the extent of the reaction with the $$\diagdown C=O\text{-containing}\diagup$$

compound and the ratio of hydroxyl groups to substituent groups and the ratio of each to the number of ester groups remaining in the molecule of the polymer. For example, two products with entirely different properties will result from the same product of polymerization of a polymerizable mass comprising an allyl ester if, in one case, the hydrolysis is carried to 90 per cent of that theoretically possible and then 45 per cent of the available hydroxyl groups are acetalized, ketalized or acetalized and ketalized while in the other case the hydrolysis is carried to 45 per cent of that theoretically possible and then 90 per cent of the available hydroxyl groups are acetalized, ketalized or acetalized and ketalized. This will be more clearly understood from a consideration of the accompanying drawing showing a triangular coordinate graph and from the following discussion of the same.

The point F on this graph designates the starting polymer or copolymer reactant, which is 100 per cent non-hydrolyzed and non-acetalized, that is, a polymer or a copolymer which has not been hydrolyzed and has not been treated with a $$\diagdown C=O\text{-containing}\diagup$$

compound; the point E designates a 100 per cent hydrolyzed polymer or copolymer; and the point A, a 100 per cent acetalized, ketalized or acetalized and ketalized polymer or copolymer. The area I, designated by the triangle ABC, covers compositions of particular utility in the production of molding compositions and electrically insulating materials. Those compositions within this area which contain less than 20 per cent of hydroxyl groups, of the maximum theoretically possible on complete hydrolysis, are particularly useful in the production of wire enamels. The area II, designated by the triangle CDF, covers compositions having properties more closely approaching those of the starting polymer or copolymer reactant than those compositions covered by areas I, III and IV. The area III, designated by the triangle BED, covers compositions of lesser resistance to water than the compositions of the other areas. These compositions are more easily dispersed in water. They are particularly adapted for use in the production of water-dispersible and hydroxylated-solvent-dispersible adhesives. The area IV, designated by the triangle BCD (middle section of the graph), covers compositions having properties intermediate to those falling within the other areas. The properties of any particular composition within this area approach those of the compositions falling within the area to which it is nearest.

It will be understood, of course, that the deductions which may be made from this graph are only general and that other variable influences in the production of the acetalized, ketalized or acetalized and ketalized polymerization product may cause some variations. This graph, however, does show the wide variations that are possible in the preparation of the new synthetic compositions of this invention and, in a general way, how the properties of the final product may be varied by varying the extent of hydrolysis and the extent of the reaction between the hydrolyzed polymer or copolymer and the $$\diagdown C=O\text{-containing}\diagup$$

compound.

From the foregoing description it will be seen that the present invention provides compositions comprising the product of chemical reaction (interaction) of the components of a mass comprising (that is, including as essential components): (1) a $$\diagdown C=O\text{-containing}\diagup$$

organic compound selected from the class consisting of aldehydes, ketones and mixtures of aldehydes and ketones, and (2) a hydrolyzed product of polymerization of a polymerizable mass comprising at least one ester selected from the class consisting of allyl esters (substituted or unsubstituted allyl esters) and their homologues. Such esters may be produced, for example, by esterification of allyl alcohol and its homologues. Illustrative examples of substituted allyl esters that may be used in carrying the present invention into effect are the halogenated allyl esters, for instance the esters of 1-halogeno-allyl alcohol and 2-halogeno-allyl alcohol such as 1-chloro-allyl, 1-bromo-allyl, 2-chloro-allyl, 2-bromo-allyl, etc., alcohols. More specific examples of the homologous allyl esters are the methallyl, ethallyl, propallyl, butallyl, iso-butylallyl, amylallyl, iso-amylallyl, phenallyl, phenmethylallyl, phenethylallyl, 3-methyl allyl, 2-phenyl allyl, benzylallyl, fluortoluylallyl, etc., esters. Mixed esters obtained by esterification of polybasic acids with different alcohols containing substituted or unsubstituted allyl and homologous allyl radicals also may comprise the polymerizable mass which is polymerized and thereafter hydrolyzed and acetalized, ketalized or acetalized and ketalized to produce these new synthetic compositions. Examples of such mixed esters are allyl methallyl, allyl ethallyl, allyl propallyl, methallyl ethallyl, methallyl propallyl, ethallyl propallyl, allyl phenallyl, allyl 1-chloro-allyl, allyl 2-chloro-allyl, etc., esters of polycarboxylic acids. Additional examples of allyl esters and their homologues which may be employed are given in various co-pending applications of mine, e. g., in copending applications Serial Nos. 302,168 and 302,169, filed October 31, 1939.

The properties of the new artificial masses of this invention may be varied in still other ways from those previously described. For example, their properties may be varied by carrying out the reaction in the presence of at least one other reactant capable of reacting with the $$\diagdown C=O\text{-containing}\diagup$$

compound or with the reaction product of the $$\diagdown C=O\text{-containing}\diagup$$

compound and the hydrolyzed polymeric body. Examples of such modifying reactants that may be used as such, or in the form of their methylol or methylene derivatives are phenols, including halogenated (e. g., chlorinated, brominated, etc.) and non-halogenated monohydric and polyhydric phenols, e. g., phenol itself and its homologues such as ortho, meta and para cresols, the xylenols, the butyl, amyl and hexyl phenols, tertiary amyl phenol, cyclohexyl phenol, phenyl phenol, indene phenol, coumar phenol, 1-phenethyl phenol, resorcinol, chlorophenol, chlorophenyl phenol, etc.; hydroxy aromatic esters, e. g., hydroxy benzoates, hydroxy phenyl acetates, hydroxy phenyl propionates, hydroxy cinnamates, etc.; hydroxy aromatic ethers, e. g., hydroquinone mono-ethers, guaiacols, etc.; monohydric and polyhydric alcohols, e. g., ethyl, propyl, isopropyl, butyl, amyl, etc., alcohols, ethylene glycol, diethylene glycol, glycerine, pentaerythritol, trimethylol nitro methane, glycol ethers, etc.; amides, both monoamides and polyamides, e. g., formamide, acetamide, stearamide, malonic diamide, succinic diamide, adipic diamide, phthalic diamide, citric triamide, itaconic diamide, sulfonamides such as toluene sulfanoamide, benzamide, urea and its homologues and derivatives and substances of the nature of urea, e. g., thiourea, methyl urea, tertiary amyl urea, phenyl thiourea, guanidine, biguanide, pseudothiourea, triazines, e. g., melamine, etc.; amines, e. g., ethylene diamine, aniline, phenylene diamine, amino phenols, etc.

The following more specific examples are given in order to illustrate more clearly how the present invention may be carried into effect. All parts are by weight.

Example 1

Eighteen and four-tenths (18.4) parts of a cross-linked polymer of diallyl malonate were reacted for 144 hours at 70° C. with

| | Parts |
|---|---|
| Aqueous formaldehyde (approximately 37.1% HCHO) | 10 |
| Concentrated hydrochloric acid | 1 |
| Acetic acid | 100 | yielding a clear viscous solution. This was poured into water containing sufficient ammonia to neutralize the excess acid and to precipitate the acetalized polymer, which thereafter was washed and dried. The dried product was a hard, tough thermoplastic resin that knitted together when heated at 175° C.

Example 2

Seventeen parts of a cross-linked polymer of diallyl oxalate were reacted at 70° C. for 144 hours with

| | Parts |
|---|---|
| Butanol (butyraldehyde) | 10 |
| Water | 4 |
| Concentrated hydrochloric acid | 1 |
| Acetic acid | 100 | yielding, after precipitation, washing and drying, a soft, rubbery, thermoplastic resin.

Example 3

Twenty-three parts of a cross-linked copolymer of 90 parts diallyl adipate and 10 parts triethylene glycol maleate phthalate were reacted for 144 hours at 70° C. with

| | Parts |
|---|---|
| Aqueous formaldehyde (approximately 37.1% HCHO) | 10 |
| Concentrated hydrochloric acid | 1 |
| Acetic acid | 100 |

This resulted in a straw-colored, viscous solution which, after precipitation, washing and drying, gave a rubbery, thermoplastic resin.

Example 4

Twenty-three parts of a cross-linked copolymer of 95 parts diallyl adipate and 5 parts methyl isopropenyl ketone were reacted for 72 hours at 60° C. with

| | Parts |
|---|---|
| Aqueous formaldehyde (approximately 37.1% HCHO) | 10 |
| Concentrated hydrochloric acid | 1 |
| Acetic acid | 100 |

The final product obtained after treatment of the reaction mass in the usual manner (precipitation, washing and drying) was a rubbery, semi-thermoplastic resin.

Example 5

Twenty-three parts of a cross-linked copolymer of 90 parts diallyl adipate and 10 parts diethyl maleate were reacted for 72 hours at 60° C. with

| | Parts |
|---|---|
| Aqueous formaldehyde (approximately 37.1% HCHO) | 10 |
| Concentrated sulfuric acid | 1 |
| Acetic acid | 100 |

The acetalized copolymer was precipitated from the reaction mass, washed and dried. The dried product was a soft, tacky, thermoplastic resin.

Example 6

Twenty parts of a cross-linked copolymer of 70 parts diallyl oxalate and 30 parts dicrotyl succinate were reacted for 48 hours at 60° C. and for an additional 48 hours at 70° C. with

| | Parts |
|---|---|
| Aqueous formaldehyde (approximately 37.1% HCHO) | 10 |
| Concentrated sulfuric acid | 1 |
| Acetic acid | 100 |

The acetalized copolymer was precipitated from the reaction mass, washed and dried to give a hard, amber, thermoplastic resin.

Example 7

Eighteen parts of a cross-linked polymer of diallyl malonate were reacted for 144 hours at 70° C. with

| | Parts |
|---|---|
| Methyl ethyl ketone | 10 |
| Water | 5 |
| Concentrated sulfuric acid | 1 |
| Acetic acid | 100 | yielding a clear, viscous solution. The final product was a very soft, sticky resin.

Example 8

Twenty-two parts of a cross-linked copolymer of 90 parts diallyl adipate and 10 parts triethylene glycol maleate phthalate were reacted for 144 hours at 70° C. with

| | Parts |
|---|---|
| Acetyl acetone | 6 |
| Water | 5 |
| Concentrated hydrochloric acid | 1 |
| Acetic acid | 100 |

This gave a clear, amber solution. Precipitation of the ketalized copolymer from this solution, followed by washing and drying, yielded a rubbery, thermoplastic resin.

Example 9

Twenty-three parts of a cross-linked copolymer of 95 parts diallyl adipate and 5 parts methyl isopropenyl ketone were reacted for 72 hours at 60° C. with

| | Parts |
|---|---|
| Acetone | 8 |
| Water | 5 |
| Concentrated hydrochloric acid | 1 |
| Acetic acid | 100 | yielding a rubbery, semi-thermoplastic resin as the final product.

Example 10

Twenty-three parts of a cross-linked copolymer of 90 parts diallyl adipate and 10 parts diethyl maleate were reacted for 72 hours at 60° C. with

| | Parts |
|---|---|
| Chloroacetone | 11 |
| Water | 5 |
| Concentrated hydrochloric acid | 1 |
| Acetic acid | 100 |

This yielded an amber-colored solution from which the ketalized copolymer was precipitated. The washed and dried product was a soft, amber resin.

*Example 11*

Twenty parts of a cross-linked copolymer of 70 parts diallyl oxalate and 30 parts dicrotyl succinate were reacted for 48 hours at 60° C. and for an additional 48 hours at 70° C. with

| | Parts |
|---|---|
| Chloroacetone | 11 |
| Water | 4 |
| Concentrated hydrochloric acid | 1 |
| Acetic acid | 100 | yielding a viscous solution. Treatment of this solution to precipitate the ketalized copolymer, followed by washing and drying of the precipitated product, gave a hard, thermoplastic resin.

*Example 12*

Nineteen parts of a cross-linked polymer of diallyl maleate were reacted for 144 hours at 70° C. with

| | Parts |
|---|---|
| Phenol | 9 |
| Aqueous formaldehyde (approximately 37.1% HCHO) | 18 |
| Concentrated hydrochloric acid | 1 |
| Acetic acid | 100 |

Prolonged heating at 70° C. of the resin isolated from the reaction mass converted the resin into a non-thermoplastic composition.

*Example 13*

Seventeen parts of a cross-linked polymer of diallyl oxalate were reacted for 144 hours at 70° C. with

| | Parts |
|---|---|
| Methyl p-hydroxy benzoate | 15 |
| Aqueous formaldehyde (approximately 37.1% HCHO) | 18 |
| Concentrated sulfuric acid | 1 |
| Acetic acid | 100 | yielding a clear, amber solution. The precipitated, washed and dried acetalized polymer was a soft, sticky thermoplastic resin.

*Example 14*

Nineteen parts of a cross-linked copolymer of 98 parts diallyl maleate and 2 parts methyl allyl ether were reacted for 144 hours at 70° C. and for an additional 72 hours at 100° C. with

| | Parts |
|---|---|
| Aqueous formaldehyde (approximately 37.1% HCHO) | 18 |
| Ethyl p-hydroxy benzoate | 17 |
| Concentrated hydrochloric acid | 1 |
| Acetic acid | 100 |

The precipitated, washed and dried acetalized copolymer was a rubbery, semi-thermoplastic resin.

*Example 15*

Twenty-three parts of a cross-linked copolymer of 90 parts diallyl adipate and 10 parts diethyl maleate were reacted for 72 hours at 60° C. with

| | Parts |
|---|---|
| Aqueous formaldehyde (approximately 37.1% HCHO) | 18 |
| Para-chlor-meta-cresol | 14 |
| Concentrated hydrochloric acid | 1 |
| Acetic acid | 100 | yielding a straw-colored solution. Precipitation of the acetalized copolymer from this solution, and washing and drying of the precipitated product, gave a soft, thermoplastic resin.

*Example 16*

Twenty parts of a cross-linked copolymer of 70 parts diallyl oxalate and 30 parts dicrotyl succinate were reacted for 48 hours at 60° C. with

| | Parts |
|---|---|
| Aqueous formaldehyde (approximately 37.1% HCHO) | 18 |
| Para-tertiary butyl phenol | 15 |
| Concentrated sulfuric acid | 1 |
| Acetic acid | 100 |

The final, washed and dried product was a powdery white resin, which fused when heated at 175° C.

*Example 17*

Seventeen parts of a cross-linked polymer of diallyl oxalate were reacted for 144 hours at 70° C. with

| | Parts |
|---|---|
| Aqueous formaldehyde (approximately 37.1% HCHO) | 18 |
| Urea | 6 |
| Concentrated hydrochloric acid | 1 |
| Acetic acid | 100 |

The final, washed and dried product was a very tough, white resin which knitted together when heated at 150° C.

*Example 18*

Nineteen parts of a cross-linked copolymer of 98 parts diallyl maleate and 2 parts methyl allyl ether were reacted for 144 hours at 70° C. with

| | Parts |
|---|---|
| Aqueous formaldehyde (approximately 37.1% HCHO) | 18 |
| Toluene sulfonamide | 34 |
| Concentrated hydrochloric acid | 1 |
| Acetic acid | 100 | yielding a straw-colored solution. The precipitated, washed and dried acetalized copolymer was a hard, brittle resin which was semi-thermoplastic.

*Example 19*

Twenty-three parts of a cross-linked copolymer of 90 parts diallyl adipate and 10 parts diethyl maleate were reacted for 72 hours at 60° C. with

| | Parts |
|---|---|
| Aqueous formaldehyde (approximately 37.1% HCHO) | 18 |
| Urea | 6 |
| Acetic acid | 100 |
| Concentrated hydrochloric acid | 1 |

The final, washed and dried product was a soft, sticky thermoplastic resin.

*Example 20*

Twenty parts of a cross-linked copolymer of 70 parts diallyl oxalate and 30 parts dicrotyl succinate were reacted for 48 hours at 60° C. and for an additional 48 hours at 70° C. with

| | Parts |
|---|---|
| Aqueous formaldehyde (approximately 37.1% HCHO) | 18 |
| Urea | 6 |
| Concentrated sulfuric acid | 1 |
| Acetic acid | 100 |

The final, washed and dried product was a hard, pale yellow resin that knitted together when heated at 175° C.

*Example 21*

Twenty-two parts of a cross-linked copolymer of 80 parts diallyl adipate and 20 parts acrylonitrile were reacted for 144 hours at 70° C. and for an additional 96 hours at 100° C. with

| | Parts |
|---|---|
| Chloroacetone | 11 |
| Water | 5 |
| Concentrated hydrochloric acid | 1 |
| Acetic acid | 100 |

The final, washed and dried product was a very hard, thermoplastic resin.

*Example 22*

Twenty parts of a cross-linked copolymer of 80 parts diallyl succinate and 20 parts acrylonitrile were reacted for 144 hours at 70° C. and for an additional 96 hours at 100° C. with

| | Parts |
|---|---|
| Aqueous formaldehyde (approximately 37.1% HCHO) | 10 |
| Concentrated sulfuric acid | 1 |
| Acetic acid | 100 |

The final, washed and dried product was a white, semithermoplastic resin with a very high softening point.

*Example 23*

Twenty parts of a cross-linked copolymer of 80 parts diallyl succinate and 20 parts acrylonitrile were reacted for 144 hours at 70° C. and for an additional 96 hours at 100° C. with

| | Parts |
|---|---|
| Aqueous formaldehyde (approximately 37.1% HCHO) | 18 |
| Methyl p-hydroxy benzoate | 15 |
| Concentrated hydrochloric acid | 1 |
| Acetic acid | 100 |

The final, washed and dried product was a hard, semithermoplastic resin with a high softening point.

*Example 24*

Twenty-two parts of a cross-linked copolymer of 80 parts diallyl adipate and 20 parts acrylonitrile were reacted for 144 hours at 70° C. and for an additional 96 hours at 100° C. with

| | Parts |
|---|---|
| Aqueous formaldehyde (approximately 37.1% HCHO) | 18 |
| Par-chlor-meta-cresol | 14 |
| Concentrated sulfuric acid | 1 |
| Acetic acid | 100 |

The final, washed and dried product was a hard, brittle, semi-thermoplastic resin.

*Example 25*

Twenty parts of a cross-linked copolymer of 80 parts diallyl succinate and 20 parts acrylonitrile were reacted for 144 hours at 70° C. and for an additional 96 hours at 100° C. with

| | Parts |
|---|---|
| Aqueous formaldehyde (approximately 37.1% HCHO) | 18 |
| Acetamide | 12 |
| Concentrated hydrochloric acid | 1 |
| Acetic acid | 100 |

The final, washed and dried product was a light-colored, semi-thermoplastic resin.

*Example 26*

Twenty-two parts of a cross-linked copolymer of 80 parts diallyl adipate and 20 parts acrylonitrile were reacted for 144 hours at 70° C. and for an additional 96 hours at 100° C. with

| | Parts |
|---|---|
| Aqueous formaldehyde (approximately 37.1% HCHO) | 18 |
| Urea | 6 |
| Concentrated sulfuric acid | 1 |
| Acetic acid | 100 |

The final, washed and dried product was a brittle, tan-colored, semi-thermoplastic resin.

The foregoing examples illustrate the production of compositions comprising the product of reaction of a $$\diagdown C=O\text{-containing}\diagup$$

organic compound selected from the class consisting of aldehydes, ketones and mixtures of aldehydes and ketones with a substance comprising a hydrolyzed product of polymerization of a polymerizable mass comprising at least one ester selected from the class consisting of allyl esters and their homologues; or with a substance comprising a hydrolyzed copolymer of a plurality of copolymerizable materials, at least one of which is an ester selected from the class consisting of allyl esters and their homologues. The examples specifically show the preparation of new and valuable synthetic compositions by simultaneously hydrolyzing and reacting with a $$\diagdown C=O\text{-containing}\diagup$$

compound, in the presence of a liquid mass comprising water and an acid catalyst, a product of polymerization of a polymerizable mass comprising an allyl ester, or comprising a copolymer of an allyl ester and another organic compound copolymerizable therewith.

The fundamental synthetic compositions of this invention may be varied widely by introducing various modifying bodies during or after the reaction of the hydrolyzed polymerization product with the $$\diagdown C=O\text{-containing}\diagup$$

compound. These modifying bodies may take the form of high molecular weight bodies, with or without resinous characteristics, for example hydrolyzed wood products, lignin, proteins, protein-aldehyde condensation products, furfural condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying bodies of a plasticizing or softening nature also may be suitably incorporated into the fundamental synthetic materials of this invention. Examples of such modifying agents are the phthalate esters, for instance dimethyl phthalate, diethyl phthalate, dibutyl phthalate, etc.; the phosphate esters, e. g., tricresyl phosphate, triphenyl phosphate, etc.; glycol di-esters, e. g., glycol di-hexoate, glycol acetate hexoate, glycol acetate benzoate, glycol di-acetoacetate, etc.; esters of furfuryl and tetrahydrofurfuryl alcohols, e. g., furfuryl and tetrahydrofurfuryl maleates, itaconates, fumarates, salicylates, phthalates, etc.; the amide esters of alkanol amines, e. g., esters corresponding to the structural formulas $RCONHCR_2CR_2OCOR$, $RCON(CR_2CR_2OCOR)_2$ and $N(CR_2CR_2OCOR)_3$, in which formulas R represents hydrogen, alkyl or aryl radicals; the semi-amides of poly-esters, e. g., semi-amides corresponding to the structural formulas

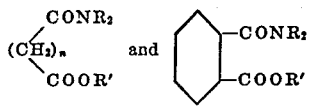

in which formulas $n$ represents 1 or more, R represents hydrogen, alkyl or aryl radicals and R' represents alkyl or aryl radicals; imides, e. g., succinimide, phthalimide, etc.; and similar substances.

The acetalized, ketalized or acetalized and ketalized polymeric bodies of this invention may be stabilized against discoloration and made more resistant to decomposition under heat, particularly in the presence of air, by incorporating into the reaction mass or into the intermediate or finished products various inhibiting or stabilizing agents. Examples of such agents which may be used are phenolic bodies, e. g., phenol, resorcinol, catechol, hydroquinone, pyrogallol, phloroglucinol, alpha- and beta-naphthols, cresols, xylenols, carvacrol, thymol, para-tertiary butyl phenol, para-tertiary amyl phenol, paraphenyl phenol, etc.; amines, e. g., ethyl, propyl, butyl and amyl amines and higher members of the homologous series, methyl amyl, ethyl hexyl, iso-propyl butyl amines, etc., alkanol amines, e. g., mono-, di- and tri-ethanol amines, etc., poly-amines, e. g., ethylene diamine, tri- and tetra-methylene diamines, etc., aromatic primary, secondary and tertiary amines, e. g., phenyl, naphthyl, naphthyl phenyl amines and substitution products of such amines, e. g., benzyl amine, ethyl naphthyl amine, diphenyl methyl amine, etc.; amides, e. g., acetamide, benzamide, toluene sulfonamide, succinic diamide, etc.; reaction products of phenols, of amines and of amides, e. g., phenol-aldehyde condensation products, amine-aldehyde condensation products, amide-aldehyde condensation products; and similar substances. The chosen stabilizer (inhibitor) depends largely upon the particular service application of the finished product. Any suitable amount of stabilizer may be used, but ordinarily only a relatively small proportion, for example from about 0.1 to 3.0 per cent by weight of the acetalized, ketalized or acetalized and ketalized polymeric body, is employed.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, calcium, cadmium, etc., waxes such as carnauba, high melting point paraffin waxes, etc., may be added to facilitate molding of the compositions. Various fillers may be used to provide a wide variety of molding compositions. As fillers may be employed, for instance, bleached or unbleached wood flour, alpha cellulose in flock form, sheets or cuttings of paper, cloth, canvas, etc., asbestos in powdered or long or short fiber length including defibrated asbestos, powdered or flaked mica, wood chips, short or long wood fibers, glass fibers in continuous filament or fabric (woven or felted) form, etc. The filled or unfilled synthetic compositions may be densified by working in a Banbury mixer, or by rolling, pelleting or other means, followed by grinding and screening to the desired particle size. The molding compositions may be molded, extruded or injected at elevated temperatures, e. g., 125° to 225° C. and at suitable pressures, e. g., at about 1000 to 20,000 pounds per square inch, usually between about 2000 and 4000 pounds per square inch in compression molding.

In addition to their use in molding compositions and in the production of molded articles, these new plastic compositions may be dissolved or dispersed in solvents or swelling agents, e. g., dioxane, furfural, furfuryl alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, China-wood oil, Perilla oil, soya bean oil, etc., pigments, plasticizers, driers and other addition agents commonly used in the production of paints, varnishes, lacquers, enamels, etc. Coating compositions made from these new synthetic materials (particularly those which are highly acetalized, ketalized or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation, the following examples are cited:

A liquid coating composition comprising an acetalized, a ketalized or an acetalized and ketalized polymeric body of the kind above described and a suitable volatile solvent is applied to a metallic conductor such as plain or tinned copper wire, for example by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated polymerization product, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the synthetic compositions of this invention in liquid state. For example, mica flakes may be cemented and bonded together with an acetalized, a ketalized or an acetalized and ketalized polymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic materials. Particularly suitable for such applications are organic plastic materials produced by reaction of butyraldehyde with a substance comprising a hydrolyzed polymerization product of a polymerizable mass comprising an allyl ester or comprising one or more allyl esters and, in addition, one or more other polymerizable substances containing at least one

grouping. In such plastic materials the hydroxyl groups of the hydrolyzed polymerization product are replaced by butyral groups.

The modified or unmodified products of this invention have a wide variety of other uses, for instance in making interior finishing and construction materials for homes, offices, etc., particularly where high-impact-strength and shock-resistant structures are desired. They also may be molded or otherwise suitably shaped to produce buttons, clock cases, radio cabinets, household utensils, decorative novelties, etc. Certain of the synthetic materials of this invention are fiber-forming, that is, they can be drawn into continuous filaments. Such filaments may be made into felted or woven fabrics. The highly acetalized, ketalized or acetalized and ketalized polymerization products are especially adapted for use as water-repellents and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein superimposed layers of cloth, paper, etc., are firmly bonded together with the synthetic material; as impregnants for electrical coils and other electrical devices; as insulation for motors, generators and other dynamo-electric machines, e. g., as insulation for coil windings, as slot insulation, in the form of sleevings over electrical connections, as separators between running and starting coil windings, etc.

What I claim as new and desire to secure by Letters Patent of the United States is:

1. A synthetic composition consisting of the product of chemical interaction of (1) a $$\diagdown_{\diagup}C=O\text{-containing}$$

organic compound selected from the class consisting of aldehydes, ketones, and mixtures of aldehydes and ketones, and (2) a partially hydrolyzed infusible, insoluble polymerized diallyl ester of a saturated aliphatic dicarboxylic acid.

2. A synthetic composition consisting of the product of chemical interaction of formaldehyde and a partially hydrolyzed infusible, insoluble polymerized diallyl adipate.

3. A synthetic composition consisting of the product of chemical interaction of formaldehyde and a partially hydrolyzed infusible, insoluble polymerized diallyl succinate.

4. A synthetic composition consisting of the product of chemical interaction of formaldehyde and a partially hydrolyzed infusible, insoluble polymerized diallyl oxalate.

GAETANO F. D'ALELIO.

CERTIFICATE OF CORRECTION.

Patent No. 2,332,900.                         October 26, 1943.

GAETANO F. D'ALELIO.

It is hereby certified that error appears in the printed specification of the above numbered patent requiring correction as follows: Page 1, first column, line 50, for "alkyl" read --alkyd--; and second column, line 44, for "form" read --from--; line 51, for "acetalyzing" read --acetalizing--; page 3, second column, line 9, for "actic" read --acetic--; page 4, second column, line 51-52, for "polymerizated" read --polymerized--; page 6, first column, line 2, for "sulfanoamide" read --sulfonamide--; line 6, after "biguanide," insert --guanyl urea,--; line 38, for "Butanol" read --Butanal--; and that the said Letters Patent should be read with this correction therein that the same may conform to the record of the case in the Patent Office.

Signed and sealed this 18th day of January, A. D. 1944.

Henry Van Arsdale, (Seal)                             Acting Commissioner of Patents.